US006597308B2

(12) United States Patent
Isaji

(10) Patent No.: US 6,597,308 B2
(45) Date of Patent: Jul. 22, 2003

(54) RADAR APPARATUS

(75) Inventor: Osamu Isaji, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/192,520

(22) Filed: Jul. 11, 2002

(65) Prior Publication Data

US 2003/0016163 A1 Jan. 23, 2003

(30) Foreign Application Priority Data

Jul. 11, 2001 (JP) .......................... 2001-211314

(51) Int. Cl.[7] .......................... G01S 13/00; G01S 13/08
(52) U.S. Cl. .......................... 342/70; 342/128; 342/199
(58) Field of Search .......................... 342/70, 109, 112, 342/128, 129, 173, 199, 200

(56) References Cited

U.S. PATENT DOCUMENTS

| 4,692,766 A | * | 9/1987 | Rolfs et al. | .................. 342/200 |
| 5,172,123 A | * | 12/1992 | Johnson | ....................... 342/200 |
| 5,642,081 A | * | 6/1997 | Bosch et al. | ..................... 331/4 |
| 5,719,580 A | * | 2/1998 | Core | ........................... 342/100 |
| 6,094,158 A | * | 7/2000 | Williams | ..................... 342/70 |
| 6,320,531 B1 | * | 11/2001 | Tamatsu | ..................... 342/109 |
| 6,420,998 B2 | * | 7/2002 | Winter et al. | ................ 342/174 |
| 6,445,335 B1 | * | 9/2002 | Tamatsu | ....................... 342/70 |

FOREIGN PATENT DOCUMENTS

| JP | 63096583 A | * | 4/1988 | ........... G01S/13/34 |
| JP | A 5-40169 | | 2/1993 | |
| JP | A 7-55924 | | 3/1995 | |
| JP | A 8-327728 | | 12/1996 | |

* cited by examiner

Primary Examiner—Thomas H. Tarcza
Assistant Examiner—Brian K Andrea
(74) Attorney, Agent, or Firm—Oliff & Berridge, PLC

(57) ABSTRACT

A modulation signal generation circuit performs frequency modulation of a VCO with a triangular wave for operation as an FM-CW radar. A signal processing circuit gives a modulation signal for detection generated from the modulation signal generation circuit to the VCO. A high-frequency signal subjected to frequency modulation in the VCO is transmitted as a radio wave from a transmission antenna and is reflected on a target and the reflected radio wave is received at a reception antenna. The reception signal and the high-frequency signal are mixed by a mixer to provide a beat signal and frequency shift corresponding to a voltage V1 is detected from the frequency of the beat signal. If the voltage V1 of the modulation signal for detection is switched, the frequency shift corresponding to different voltage V1 can be provided and the frequency modulation characteristic can be detected.

22 Claims, 15 Drawing Sheets

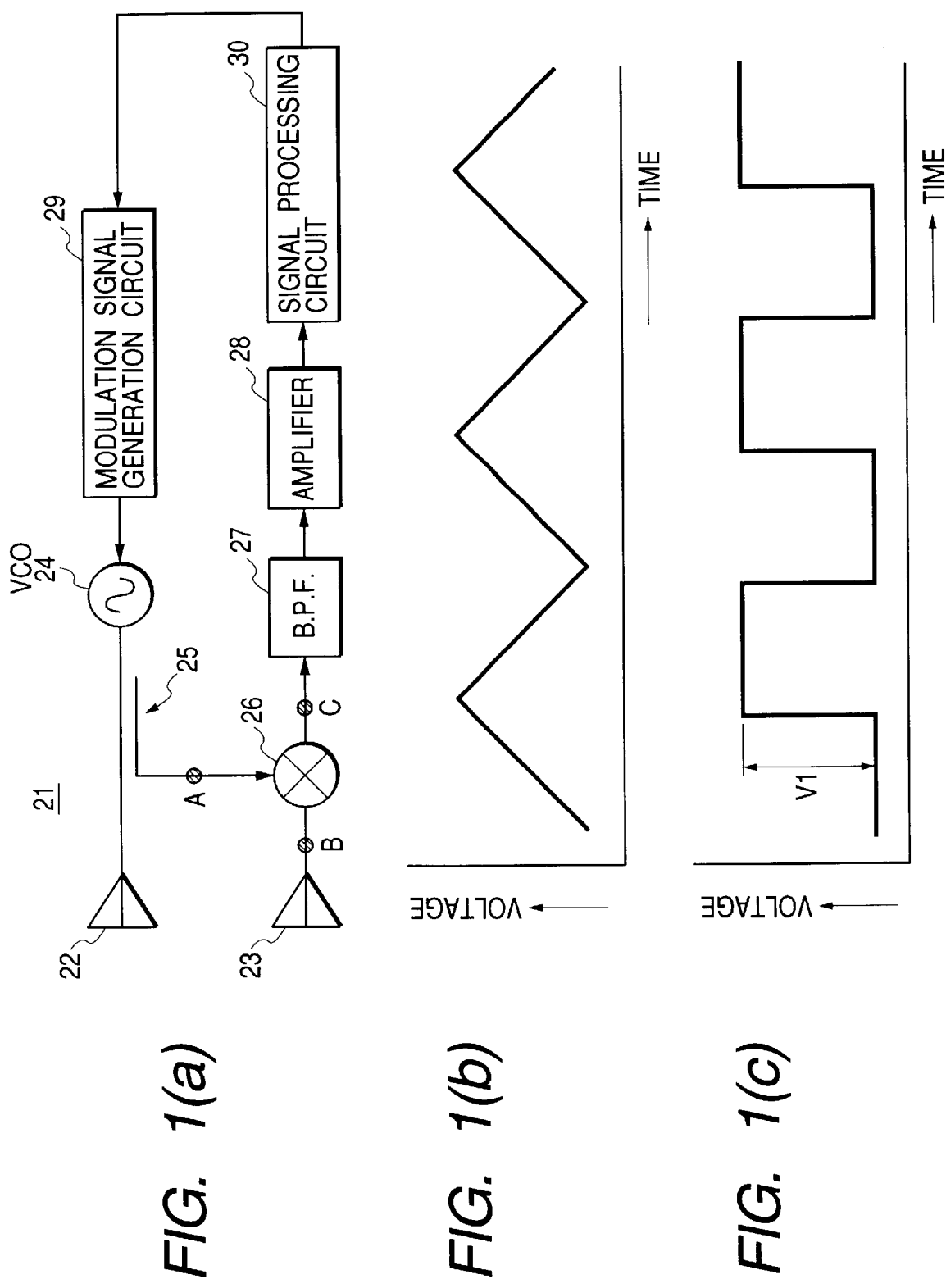

FIG. 4(a) MODULATION WAVEFORM

FIG. 4(b) BEAT SIGNAL

FIG. 5(a) MODULATION WAVEFORM

FIG. 5(b) BEAT SIGNAL

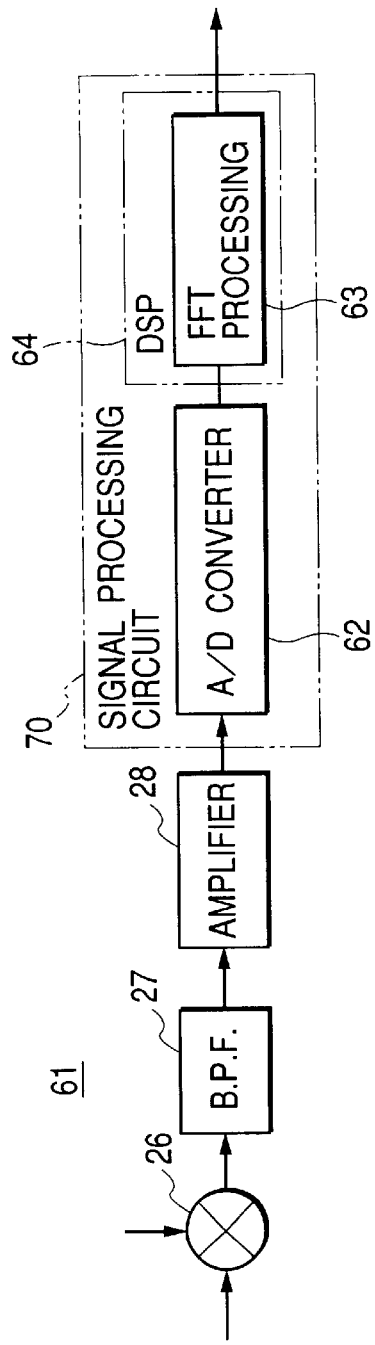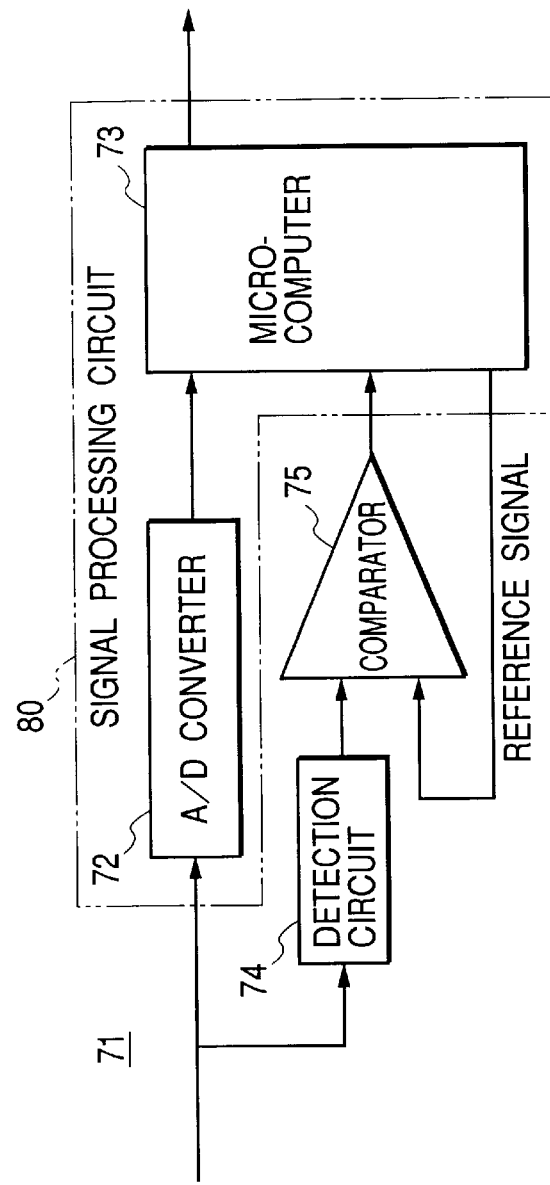

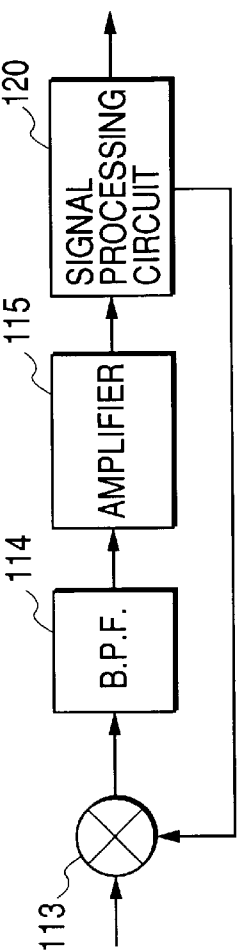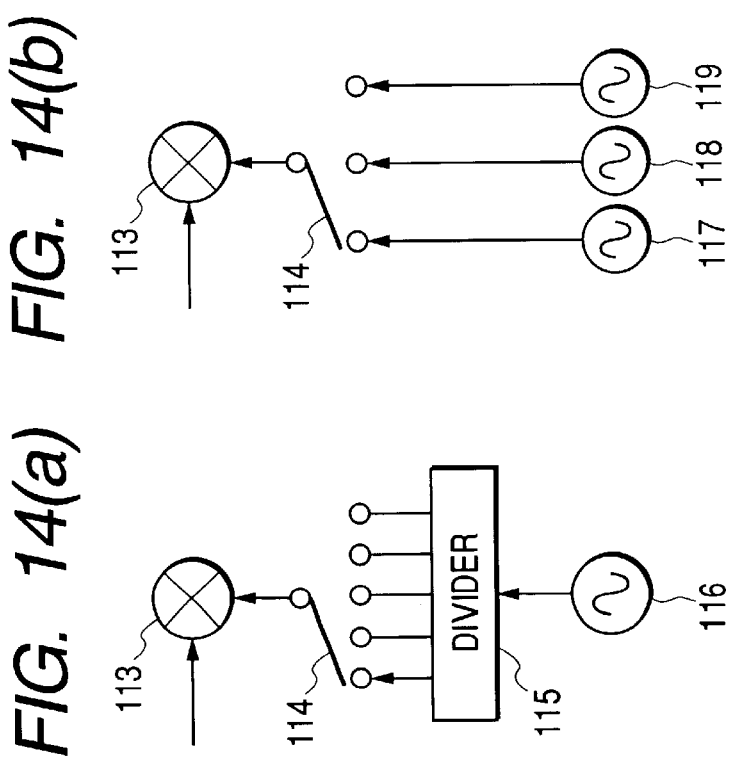

RADAR APPARATUS

The present disclosure relates to the subject matter contained in Japanese Patent Application No.2001-211314 filed on Jul. 11, which is incorporated herein by reference in its entirety.

BACKGROUND OF THE INVENTION

1. Field of the Invention

This invention relates to a radar apparatus using frequency modulation (FM) such as an FM-CW system and in particular to detection and correction of the frequency modulation characteristic thereof.

2. Description of the Related Art

Hitherto, an FM-CW system radar 1 having a basic configuration as shown in FIG. 16 has been mainly installed in an automobile for use to give a collision alarm, prevent or lighten a collision, perform vehicle-to-vehicle control of auto cruise control, drive a car, etc. FIG. 16 (a) shows a schematic electric configuration and FIG. 16 (b) shows a modulation signal waveform. Related arts to the FM-CW system radar are disclosed in JP-A-5-40169, JP-A-7-55942, JP-A-8-327728, etc., for example. JP-A-5-40169 discloses an art for using second frequency modulation to improve the reception S/N ratio.

In the basic configuration of the FM-CW system radar 1, a radio wave is transmitted from a transmission antenna 2 and the reflected radio wave from a target, etc., is received at a reception antenna 3, as shown in FIG. 16 (a). A high-frequency signal of a millimeter waveband generated from a VCO (voltage-controlled oscillator) 4 is given to the transmission antenna 2. A part of the high-frequency signal for exciting the transmission antenna 2 from the VCO 4 branches from a coupler 5 and is mixed with a reception signal from the reception antenna 3 by a mixer 6. An output signal from the mixer 6 is selected through a BPF (band-pass filter) 7 and is amplified by an amplifier 8. The high-frequency signal generated from the VCO 4 is subjected to frequency modulation in accordance with the voltage level of a modulation signal given by a modulation signal generation circuit 9.

For example, in the FM-CW system radar 1 of a millimeter waveband, a modulation signal shaped like a triangular wave of about several hundred Hz as shown in FIG. 16 (b) is used to generate an FM wave with the maximum frequency shift amount being several ten to several hundred MHz. As the modulation signal, a saw tooth wave (chirp wave) maybe used in some cases. If the frequency modulation characteristic of the VCO 4 has good linearity relative to change in the voltage level of the modulation signal, the frequency of the high-frequency signal generated from the VCO 4 also changes linearly corresponding to FIG. 16 (b). The frequency of the reflected radio wave received at the reception antenna 3 is delayed from the frequency of the high-frequency signal given to the transmission antenna 2 as much as the time taken for the radio wave to go and back at the distance to the target. If the high-frequency signal whose frequency changes like a triangular wave corresponding to FIG. 16 (b) is generated from the VCO 4 and the distance to the target is constant, the signal output from the mixer 6 contains a beat signal component of a constant frequency corresponding to the time taken for the radio wave to go and back at the distance. The beat signal component is selected through the BPF 7 and is amplified by the amplifier 8 and then can be input to a signal processing circuit 10 for calculating the distance to the target. When the distance to the target changes, the effect of Doppler shift appears in the frequency of the beat signal and the relative speed can also be calculated by the signal processing circuit 10. Letting the frequency of the beat signal be fb, the frequency depending on the distance be fx, and the frequency depending on the relative speed be fd, $$fb = fx \pm fd.$$

With the FM-CW system radar 1, the frequency modulation characteristic in the VCO 4 has an importance effect on the measurement accuracy. JP-A-7-55942 discloses an art for previously measuring the frequency modulation characteristic of a voltage-controlled oscillator for generating a high-frequency signal of an FM-CW radar and making a correction with an inverse function of the measured characteristic for improving linearity. JP-A-8-327728 discloses an art for correcting a modulation signal so that the frequency of a high-frequency signal generated in an FM-CW radar apparatus changes like a triangular wave. JP-A-6-34756 discloses an art wherein the linearity of a voltage-controlled oscillator for generating a high-frequency signal as a source of a transmission radio wave in a radar transponder for transmitting a frequency-modulated radio wave and responding upon reception of a radio wave from a radar is corrected with data previously stored in memory. However, the related arts do not give any direct description as to how the frequency modulation characteristic is measured.

FIG. 17 shows a schematic configuration for measuring the frequency modulation characteristic and sensing whether or not linearity is maintained in the FM-CW system radar 1 in the related art shown in FIG. 16 (a). Another signal source 11 is provided, the high-frequency signal from the VCO 4 is branched by a coupler 12 and is mixed by a mixer 13 for down conversion, and the difference from the frequency of the signal source 11 is counted by a counter 14. In addition to such down conversion, a method of counting the frequency of the high-frequency signal from the VCO 4 is also available.

The FM-CW system radar 1, etc., installed in a vehicle is used in a hostile environment concerning vibration, temperature, etc. Thus, if the linearity of the frequency modulation characteristic is good at the initial stage, there is a possibility of degradation while the radar is used. If the down converter configuration as shown in FIG. 17 is adopted to install a configuration for detecting the linearity of the frequency modulation characteristic in the FM-CW system radar 1 itself, as the signal source 11, the mixer 13, and the like, expensive components for high frequencies of a millimeter waveband become necessary. To count the frequency of the high-frequency signal from the VCO 4, the millimeter waveband cannot directly be counted and therefore a frequency divider needs to be used. However, the frequency divider operating in the millimeter waveband is expensive and as the frequency dividing ratio increases, the measurement accuracy is degraded.

That is, if an attempt is made to detect and correct the frequency modulation characteristic in the system in the related art as shown in FIG. 17, the following problems are involved:

(1) The higher the transmission frequency, the higher the costs of the components, such as a detector and a frequency divider.

(2) The higher the transmission frequency, the larger the frequency dividing ratio and the worse the measurement accuracy.

BRIEF SUMMARY OF THE INVENTION

It is an object of the invention to provide a radar apparatus that can detect and correct the frequency modulation characteristic in a simple configuration at low costs.

According to the invention, there is provided a radar apparatus for performing frequency modulation of a high-frequency signal, transmitting the frequency-modulated signal, and receiving a reflected radio wave to detect a target, the radar apparatus including a high frequency generation section for generating the high-frequency signal, a modulation signal generation section for generating and giving a modulation signal to the high frequency generation section to modulate the high frequency signal, a mixing section for mixing the high-frequency signal and the reception signal of the reflected radio wave, and a signal processing section for controlling the modulation signal generation section so as to give a modulation signal for detection changing among a plurality of predetermined signal levels and retained for a predetermined time for each signal level to the high frequency generation section, detecting frequency of a differential signal between the high-frequency signal and the reception signal, inputted from the mixing section, and detecting a frequency modulation characteristic of the high frequency generation section based on the relationship between a signal level of the modulation signal for detection and the frequency of the differential signal.

According to the invention, the radar apparatus for performing frequency modulation of a high-frequency signal, transmitting the frequency-modulated signal, and receiving a reflected radio wave for detecting a target comprises the modulation signal generation section, the mixing section, and the signal processing section. The modulation signal generation section generates a modulation signal whose change state can be controlled and gives the signal to the high frequency generation section. The mixing section mixes the high-frequency signal generated from the high frequency generation section and the reception signal of the reflected radio wave. The signal processing section controls the modulation signal generation section so as to give modulation signal for detection changing between a plurality of predetermined signal levels and retained for a predetermined time for each signal level to the high frequency generation section, inputs the signal of the component of the difference between the high-frequency signal and the reception signal from the mixing section, detects the frequency, and detects the frequency modulation characteristic of the high frequency generation section based on the relationship between the signal level of the modulation signal for detection and the frequency. The modulation signal for detection generated from the modulation signal generation section is changed between a plurality of predetermined signal levels and is mixed with the reception signal from the target by the mixing section, the frequency of the signal of the component of the difference is detected, the relationship between the signal level of the modulation signal for detection and the frequency is found, and the frequency modulation characteristic of the high frequency generation section can be detected. The reception signal can be used as the high-frequency signal source to detect the frequency modulation characteristic and the mixing section for reception can also be shared, so that the frequency modulation characteristic can be detected easily in the inexpensive configuration.

The invention provides the radar apparatus further including a modulation characteristic correction section for correcting the modulation signal based on the frequency modulation characteristic detected by the signal processing section so that the frequency modulation characteristic is not placed out of a predetermined normal range.

According to the invention, the modulation signal is corrected so that the frequency modulation characteristic that can be detected easily in the inexpensive configuration is not placed out of the predetermined normal range, so that the frequency modulation characteristic can also be corrected easily in the inexpensive configuration.

The invention provides the radar apparatus further including a width calculation section for calculating frequency modulation width, which is a difference between frequency of the differential signal when the signal level of the modulation signal is the maximum value and frequency of the differential signal when the signal level is the minimum value based on the frequency modulation characteristic detected by the signal processing section.

According to the invention, the frequency modulation width of the difference between the frequency when the signal level of the modulation signal is the maximum value and the frequency when the signal level is the minimum value can be calculated based on the frequency modulation characteristic detected as frequency change between a plurality of signal levels.

In the radar apparatus of the invention, the width calculation section includes a counter for counting the frequency of the difference.

According to the invention, frequency change between a plurality of signal levels is counted by the counter, so that frequency change can be measured easily.

The invention provides the radar apparatus further including a width correction section for correcting the modulation signal based on the frequency modulation width calculated by the width calculation section so that the frequency modulation width has a predetermined value.

According to the invention, the frequency modulation width of the frequency modulation characteristic can also be corrected to the predetermined value. When the distance is calculated in the signal processing section, a correction can also be made on the arithmetic operations.

In the radar apparatus of the invention, one of the modulation characteristic correction section and the width correction section performs the correction when the level of the reception signal of the reflected radio wave is equal to or greater than a predetermined level.

According to the invention, if the level of the reception signal is equal to or greater than the predetermined level, a correction is made and thus can be made stably.

The invention provides the radar apparatus further including further comprising a temperature detection section, in which one of the modulation characteristic correction section and the width correction section performs the correction when a temperature detected by the temperature detection section has a predetermined temperature.

According to the invention, if the frequency of the high-frequency signal generated from the high frequency generation section changes with the temperature, a correction is made if the predetermined temperature of the temperature detection section is reached, so that the effect of the temperature can be decreased and the accuracy of the frequency modulation characteristic can be enhanced.

In the radar apparatus of the invention, one of the modulation characteristic correction section and the width correction section performs the correction when a distance to the target is in a predetermined distance range.

According to the invention, the distance range, etc., having a high possibility that the signal level of the reception signal will lower is placed out of the predetermined distance range, whereby correction processing is not entered, so that accuracy degradation of correction can be avoided.

In the radar apparatus of the invention, one of the modulation characteristic correction section and the width correction section performs the correction when relative speed of the target is in a predetermined speed range.

According to the invention, the relative speed of the target is considered and if the relative speed of the target is placed in the predetermined speed range, a correction is made, so that the accuracy of the correction can be enhanced.

In the radar apparatus of the invention, the signal processing section detects the frequency modulation characteristic when an input level of the reflected radio wave from the target is equal to or greater than a predetermined reference level at a normal radar operation time.

According to the invention, if the input level of the reception signal is equal to or greater than the predetermined reference level, the frequency modulation characteristic is detected, so that the radar apparatus can concentrate attention on usual target detection processing.

In the radar apparatus of the invention, the signal processing section detects the frequency modulation characteristic when a distance to the target is in a predetermined distance range.

According to the invention, if the distance to the target is out of the predetermined distance range, the frequency modulation characteristic is not detected, so that the radar apparatus can concentrate attention on usual target detection processing.

In the radar apparatus of the invention, wherein the signal processing section detects the frequency modulation characteristic just after detecting the target initially after a radar operation starts and determines whether or not a normal modulation operation for the high frequency generation section is performed.

According to the invention, if the target is detected initially and it is made possible to receive the reflected radio wave, whether or not the frequency modulation characteristic of the high frequency modulation section is normal is determined, so that occurrence of an anomaly can be found at an early stage if the anomaly occurs.

The invention provides the radar apparatus further including a reference signal source for generating a reference signal to decrease a frequency with respect to the differential signal between the high-frequency signal and the reception signal, the differential signal inputted to the signal processing section from the mixing section, in which the signal processing section detects the frequency modulation characteristic based on the inputted differential signal with the frequency decreased by the reference signal.

According to the invention, for the component of the difference between the high-frequency signal and the reception signal provided by the mixing section, the reference signal generated from the reference signal source is heterodyned and the frequency is decreased, so that frequency measurement is facilitated.

In the radar apparatus of the invention, the reference signal source includes a basic signal generation section for generating a basic signal, which is a source of the reference signal, and a frequency division section for dividing the frequency of the basic signal generated from the basic signal generation section according to one of frequency dividing ratios that can be switched to convert the basic signal into the reference signal.

According to the invention, the frequency dividing ratio of the frequency division section is changed for switching the frequency of the reference signal provided by dividing the frequency of the basic signal generated from the basic signal generation section, the frequency is lowered, and the frequency measurement accuracy can be enhanced.

In the radar apparatus of the invention, the reference signal source includes a plurality of reference signal generation sections and selects one of the reference signal generation sections to generate the reference signal.

According to the invention, a plurality of reference signal generation section are switched for generating the reference signal and the signal components provided by switching the reference signal generation section are compared, whereby it is made possible to determine the frequency to be measured, and the accuracy can be enhanced.

In the radar apparatus of the invention, the reference signal source comprises a signal arithmetic section for generating the reference signal by performing arithmetic processing according to a preset program.

According to the invention, the reference signal of the frequency fitted for frequency measurement can be generated for enhancing the measurement accuracy.

In the radar apparatus of the invention, the reference signal source supplies a clock signal for a signal arithmetic processing to the signal processing section.

According to the invention, generation of the reference signal and clock signal supply to the signal processing section can be conducted from the common reference signal source, so that space saving and cost reduction are made possible.

In the radar apparatus of the invention, a frequency of the reference signal is set so that a difference from the frequency of the reception signal from the target is within a beat signal band at a time of a radar operation.

According to the invention, the reference signal set within the beat signal band is used, so that the band of the frequency of the difference provided by heterodyning can be lowered for enhancing the measurement accuracy.

In the radar apparatus of the invention, the signal processing section performs at least a part of processing of the beat signal.

According to the invention, the configuration is shared between at least a part of beat signal processing and a part of detection processing of the frequency modulation characteristic, so that the whole configuration can be simplified and can be implemented at low costs.

In the radar apparatus of the invention, the signal processing section changes a predetermined time for holding a signal level of the modulation signal for detection in response to a distance to the target.

According to the invention, frequency modulation characteristic detection can be optimized in response to the distance to the target and the detection accuracy can be enhanced.

In the radar apparatus of the invention, the signal processing section changes a predetermined time for holding a signal level of the modulation signal for detection in response to a relative speed of the target.

According to the invention, the detection accuracy of the frequency modulation characteristic can be enhanced considering the relative speed with the target.

In the radar apparatus of the invention, the signal processing section detects the frequency of the differential signal between the high-frequency signal and the reception signal considering a Doppler shift based on a relative speed of the target.

According to the invention, if it is difficult to find out a relatively still object when the radar is installed in an automobile, etc., the frequency modulation characteristic can be detected with good accuracy considering the Doppler shift.

BRIEF DESCRIPTION OF THE DRAWINGS

In the accompanying drawings:

FIG. 1 (a) is a block diagram to show a schematic electric configuration of an FM-CW system radar 21 of a first embodiment of the invention, FIG. 1 (b) is a waveform chart to show the waveform of a modulation signal, and FIG. 1 (c) is a waveform chart to show the wave form of a modulation signal for detection;

FIG. 8 is a block diagram to show a partial electric configuration of an FM-CW system radar 61 of a fourth embodiment of the invention;

FIG. 9 is a block diagram to show a schematic electric configuration of an FM-CW system radar 71 of a fifth embodiment of the invention;

FIGS. 14(a)–(c) are block diagrams to show a configuration example of a signal source 12 in the embodiment in FIG. 13;

DETAILED DESCRIPTION OF THE PREFERRED EMBODIMENTS

Figure 2A:
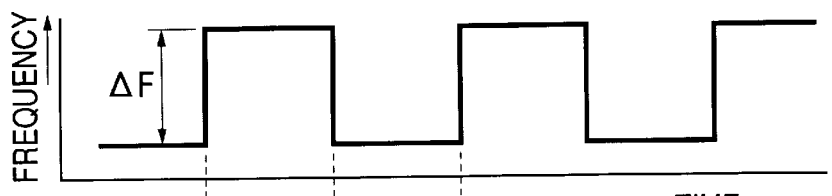
FIGS. 2 (a) to 2 (c) are time charts to show the principle to enable a frequency shift to be provided based on the modulation signal for detection in the first embodiment of the invention.

Referring now to the accompanying drawings, there are shown preferred embodiments of the invention. Parts identical with or similar to those described in advance are denoted by the same reference numerals and will not be discussed again. A plurality of embodiments can also be combined in a range in which they do not overlap each other. Further, the common portions to those of the preceding embodiments may not be discussed again.

Figure 16A:
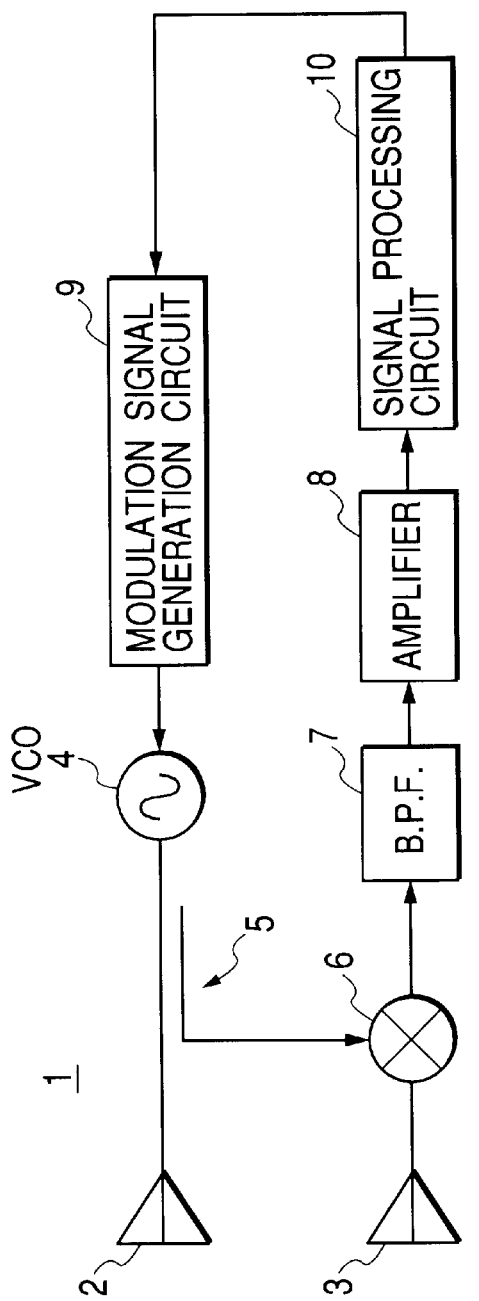
FIG. 16 (a) is a block diagram to show a schematic electric configuration of an FM-CW system radar 1 in a related art and FIG. 16 (b) is a waveform chart of a modulation signal.
Figure 16B:
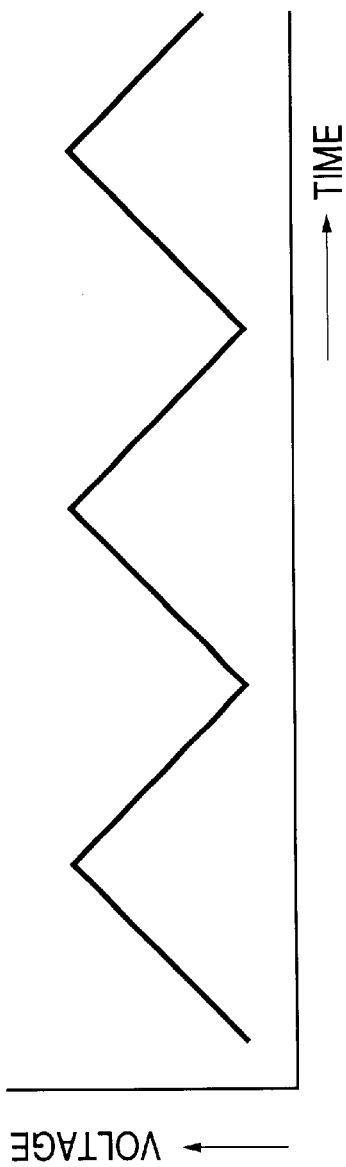
Figure 17:
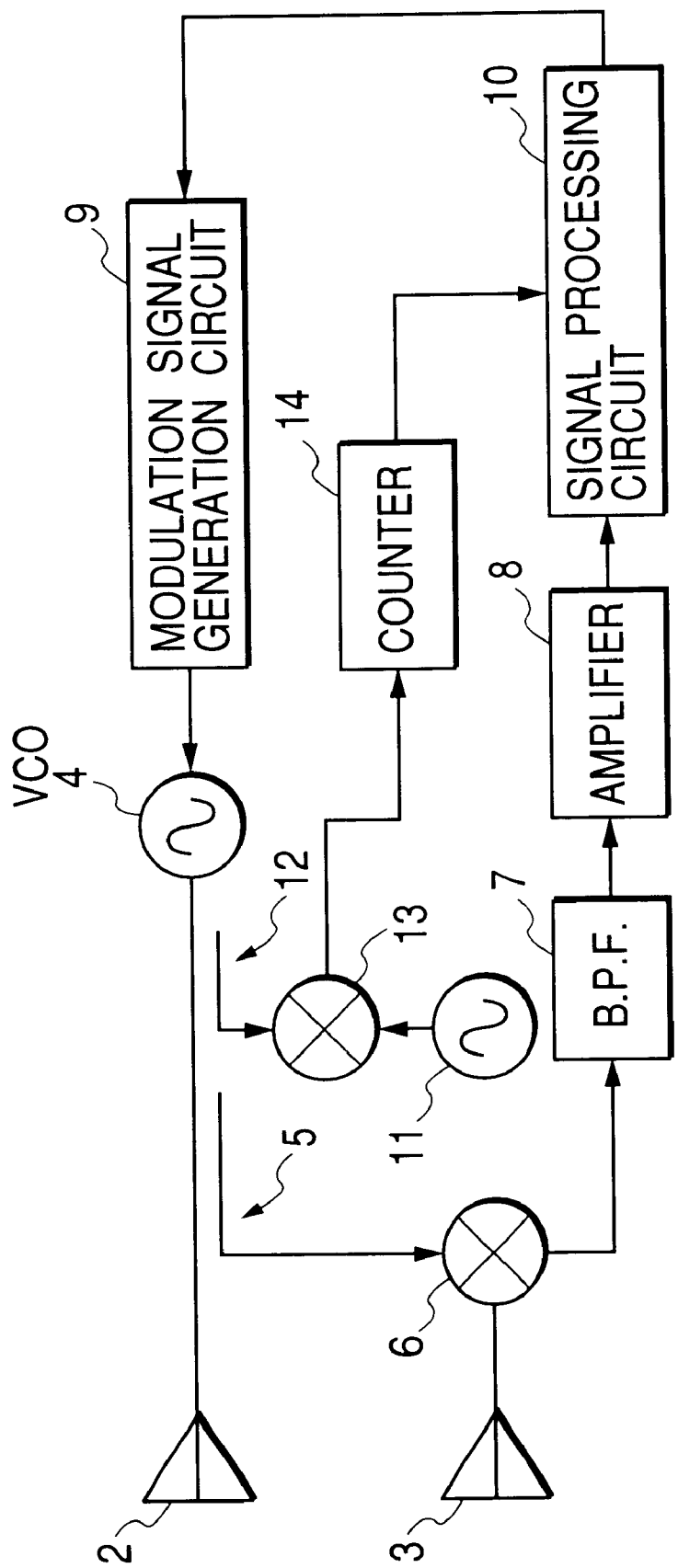
FIG. 17 is a block diagram to show the electric configuration to detect the frequency modulation characteristic in the FM-CW system radar in FIG. 16.

FIG. 1 (a) shows a schematic electric configuration of an FM-CW system radar 21 of a first embodiment of the invention, FIG. 1 (b) shows the waveform of a modulation signal, and FIG. 1 (c) shows the waveform of a modulation signal for detection. The FM-CW system radar 21 of the embodiment has a basic configuration similar to that of the FM-CW system radar 1 in the related art shown in FIG. 16 (a). That is, it includes a transmission antenna 22, a reception antenna 23, a VCO 24, a coupler 25, a mixer 26, a BPF 27, an amplifier 28, a modulation signal generation circuit 29, and a signal processing circuit 30. A radio wave is transmitted from the transmission antenna 22 and the reflected radio wave from a target, etc., is received at the reception antenna 23. A high-frequency signal of a millimeter waveband generated from the VCO (voltage-controlled oscillator) 24 is given to the transmission antenna 22. A part of the high-frequency signal for exciting the transmission antenna 22 from the VCO 24 branches from the coupler 25 and is mixed with a reception signal from the reception antenna 23 by the mixer 26. A beat signal in an output signal from the mixer 26 is selected through the BPF (band-pass filter) 27 and is amplified by the amplifier 28. The high-frequency signal generated from the VCO 24 is subjected to frequency modulation in accordance with the voltage level of a modulation signal given by the modulation signal generation circuit 29. The beat signal is processed by the signal processing circuit 30 for calculating the distance to the target and the relative speed.

For example, in the FM-CW system radar 21 of a millimeter waveband, a modulation signal shaped like a triangular wave of several hundred Hz as shown in FIG. 1 (b) is used to generate an FM wave with the maximum frequency shift amount being several ten to several hundred MHz. As the modulation signal, a saw tooth wave (chirp wave) may be used in some cases. The normal operation of the FM-CW system radar 21 is similar to that of the FM-CW system radar 1 in the related art shown in FIG. 16. In the embodiment, a modulation signal for detection shaped like a rectangular wave changing at voltage V1 as shown in FIG. 1 (c) is given to the VCO 24 from the modulation signal generation circuit 29. Therefore, it is made possible to sense whether or not the frequency modulation characteristic of the VCO 24 has good linearity relative to change in the voltage level of the modulation signal.

Figure 2B:
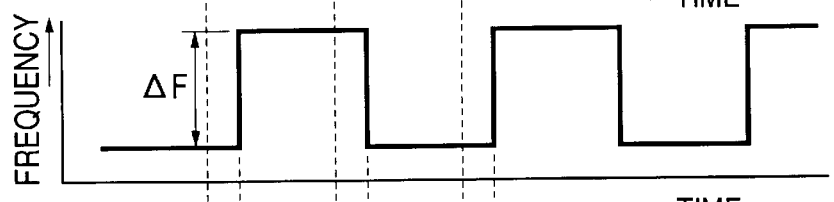
Figure 2C:
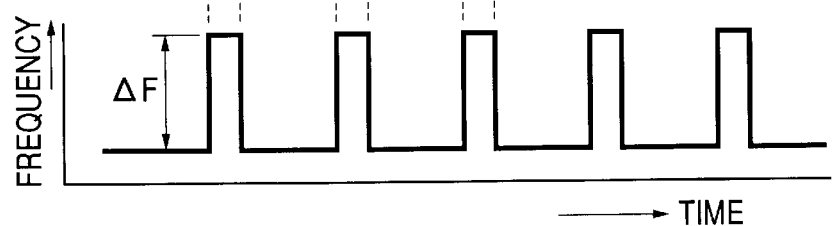

FIGS. 2 (a) to 2 (c) show the principle to provide the shift component of frequency modulation corresponding to the modulation signal for detection shaped like a rectangular wave shown in FIG. 1 (c). From the VCO 24, frequency shift component ΔF is provided in response to change in voltage V1 as in FIG. 1 (c). For the frequency shift component ΔF, at A point in FIG. 1 (a), a signal waveform as shown in FIG. 2 (a) is provided and is almost the same as the waveform transmitted from the transmission antenna 22. At B point in FIG. 1 (a) where the radio waves reflected on the target is received at the reception antenna 23, the phase is delayed as shown in FIG. 2 (b) based on the propagation delay of the radio wave. At C point on the output side of the mixer 26 as shown in FIG. 1 (a), a beat signal of frequency of ΔF is provided only for the time period of the propagation delay. If the relative speed to the target is not zero, a Doppler shift component is also contained, but is about several kHz. Since the frequency ΔF of the beat signal is several MHz to several 10 MHz, the effect of the Doppler shift component is small.

Figure 3:
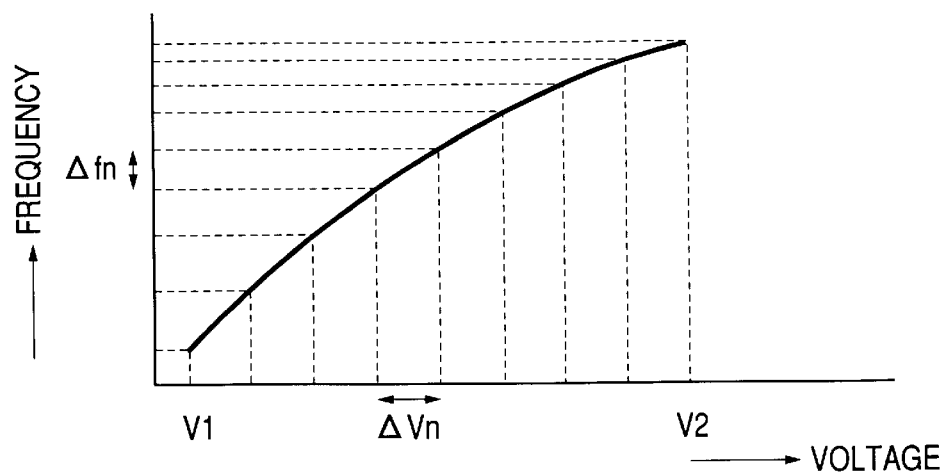
FIG. 3 is a graph to show an example of the frequency modulation characteristic of the VCO 24 in FIG. 1 (a)

FIG. 3 shows an example of the frequency modulation characteristic in the VCO 24 in FIG. 1 (a). The frequency shift amount between the minimum value V1 of the lower limit voltage of the modulation signal and the maximum value V2 of the upper limit voltage is found by adding up frequency shift Δfn corresponding to section voltage ΔVn. As a method of changing the voltage level between V1 and V2 to provide the modulation signal for detection, it is possible to change the voltage level (modulation signal for detection) stepwise as shown in FIG. 4 and it is possible to change the pulse-like peak value as shown in FIG. 5.

Figure 4:
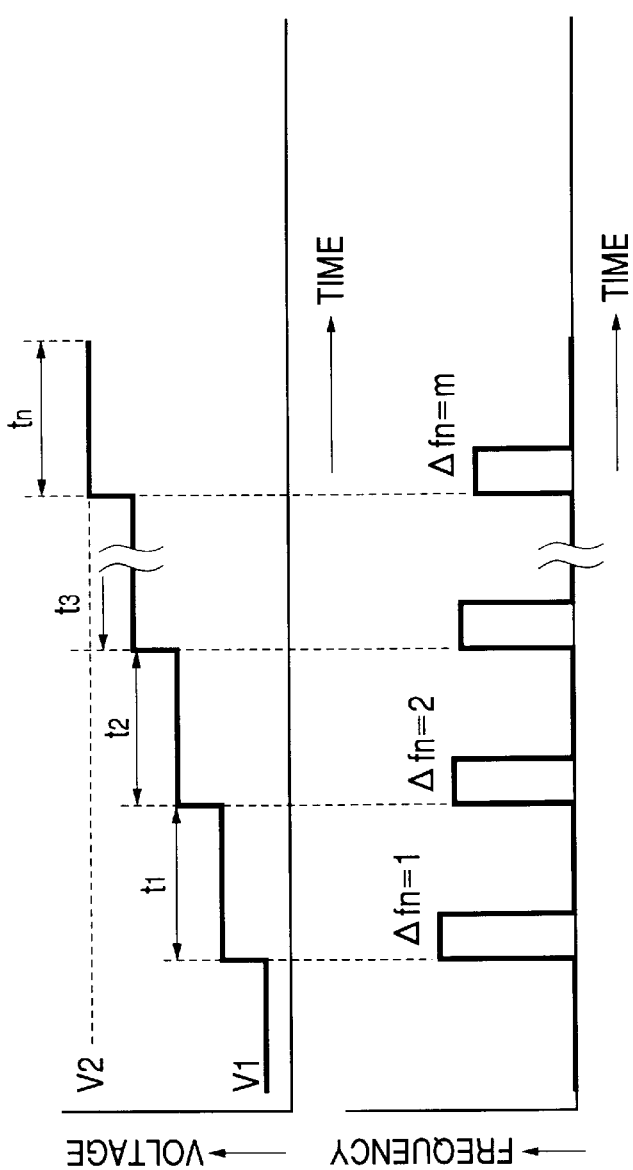
FIG. 4 (a) is a waveform chart of a modulation signal for detection generated in a modulation signal generation circuit 29 in FIG. 1 and FIG. 4 (b) is a time chart of a beat signal provided.
Figure 5:
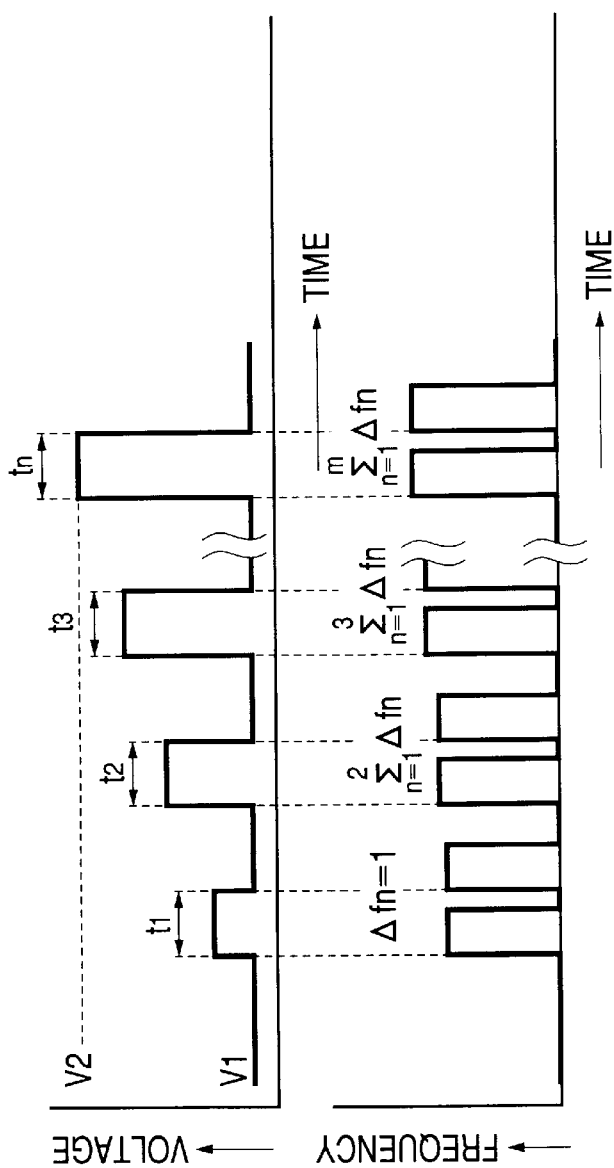
FIG. 5 (a) is a waveform chart of a modulation signal for detection generated in the modulation signal generation circuit 29 in FIG. 1 and FIG. 5 (b) is a time chart of a beat signal provided.

FIG. 4 (a) shows the waveform of the modulation signal for detection changing stepwise and FIG. 4 (b) shows the frequency shift of the beat signal. FIG. 5 (a) shows the waveform of the modulation signal for detection changing like a pulse and FIG. 5 (b) shows the frequency shift of the beat signal. In the frequency shift in FIG. 4 (b) corresponding to the stepwise voltage change in FIG. 4 (a), the modulation width is found by adding up the frequency shift components as shown in expression (1) given below. For the voltage change like a pulse as in FIG. 5 (a), the last frequency shift component shown in FIG. 5 (b) is the added-up value.

$$\text{Modulation Width } (\Delta f) = \sum_{n=1}^{m} \Delta f_n \quad (1)$$

In the embodiment, there is provided the FM-CW system radar apparatus 21 in which a modulation signal shaped like a triangular wave is given to the VCO 24 of a high-frequency generation section to generate a high-frequency signal whose frequency changes and a radio wave is transmitted from the transmission antenna 22 based on the generated high-frequency signal and the reflected radio wave is received for detecting the target. The radar apparatus 21 includes the modulation signal generation circuit 29 of a modulation signal generation section, the mixer 26 of a mixing section, and the signal processing circuit 30 of a signal processing section. The modulation signal generation circuit 29 generates a modulation signal for detection whose change state can be controlled and gives the modulation signal to the VCO 24. The mixer 26 mixes the high-frequency signal generated from the VCO 24 and the reception signal of the reflected radio wave. The signal processing circuit 30 controls the modulation signal generation circuit 29 so as to give the modulation signal for detection changing among a plurality of predetermined signal levels and retained for a predetermined time for each signal level to the VCO 24, as shown in FIG. 4 (a), 5 (a). The signal processing circuit 30 inputs the signal of the component of the difference between the high-frequency signal and the reception signal from the mixer 26 to detect the frequency, and detects the frequency modulation characteristic of the VCO 24 based on the relationship between the signal level of the modulation signal for detection and the frequency. The reception signal is used as the high-frequency signal source for frequency characteristic detection and the mixer 26 for reception can also be shared, so that the frequency modulation characteristic can be detected easily in the inexpensive configuration.

Figure 6:
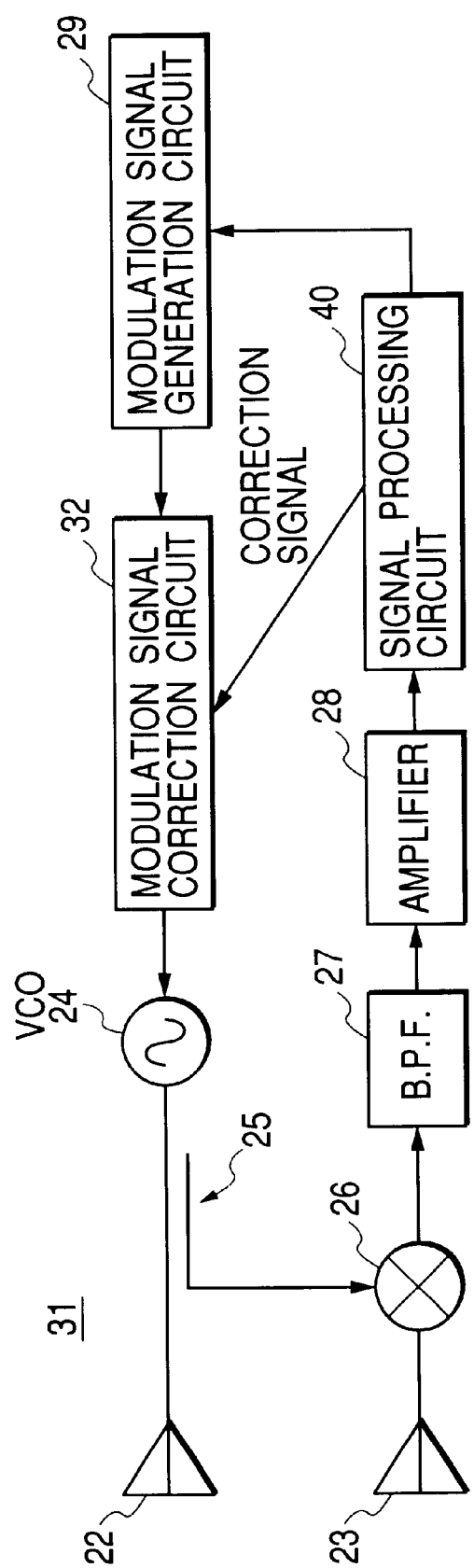
FIG. 6 is a block diagram to show a schematic electric configuration of an FM-CW system radar 31 of a second embodiment of the invention.

FIG. 6 shows a schematic electric configuration of an FM-CW system radar 31 of a second embodiment of the invention. In the second embodiment, a modulation signal correction circuit 32 corrects a modulation signal of a triangular wave, etc., generated by a modulation signal generation circuit 29 and gives the corrected modulation signal to a VCO 24. The modulation signal correction circuit 32 corrects the modulation signal in accordance with a correction signal given by a signal processing circuit 40. The signal processing circuit 40 generates the correction signal so that the frequency modulation characteristic detected in a similar manner to that in the first embodiment is not placed out of a predetermined normal range. For the frequency modulation characteristic, the linearity indicating the linearity range and the modulation width indicating the upper and lower limits are corrected. To correct the linearity, a polygonal line circuit, etc., can be used. To correct the modulation width, a gain control amplifier, a variable attenuator, etc., can be used. The modulation signal correction circuit 32 serves as a range correction section if it makes a linearity correction; the modulation signal correction circuit 32 serves as modulation characteristic correction section if it corrects the modulation width.

Figure 7:
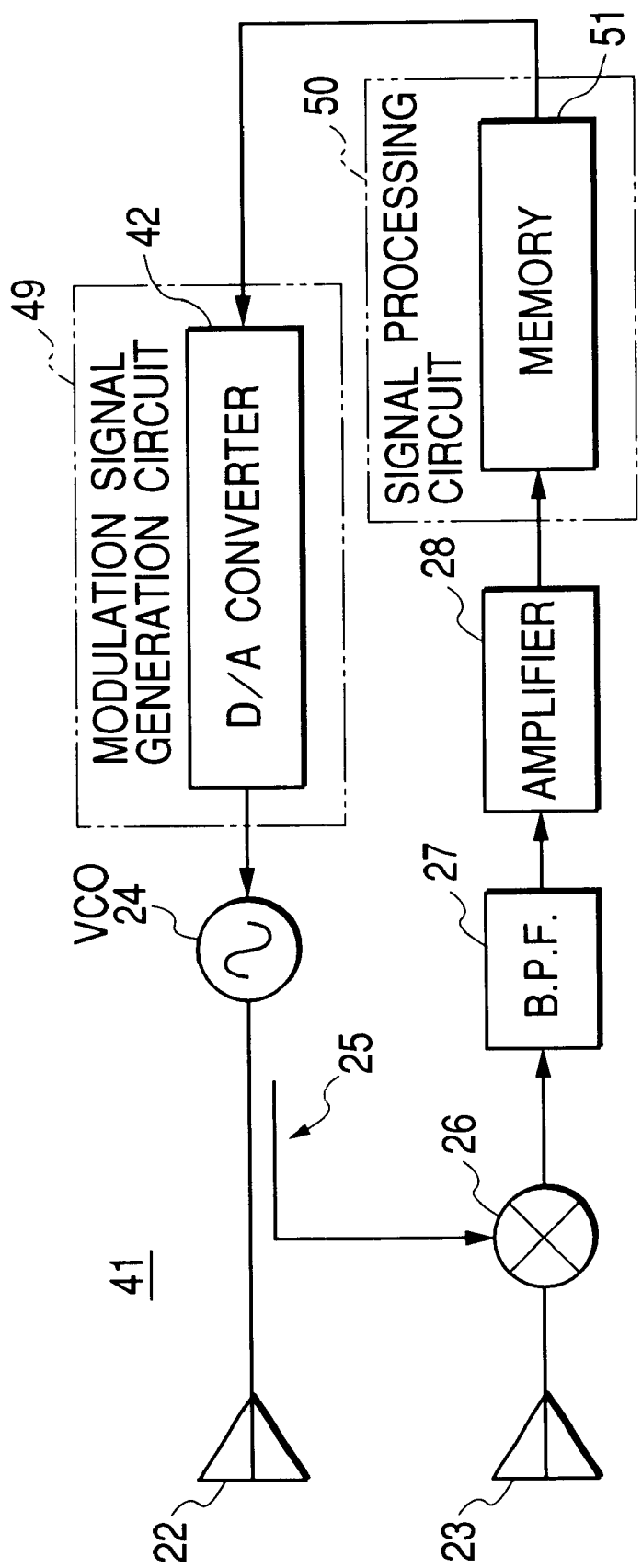
FIG. 7 is a block diagram to show a schematic electric configuration of an FM-CW system radar 41 of a third embodiment of the invention.

FIG. 7 shows a schematic electric configuration of an FM-CW system radar 41 of a third embodiment of the invention. In the third embodiment, a modulation signal generation circuit 49 includes a D/A converter 42 for converting a digital signal representing modulation data given by a signal processing circuit 50 into an analog signal to generate a modulation signal. The signal processing circuit 50 detects the frequency modulation characteristic in a similar manner to that in the first embodiment and stores modulation data for correcting the detected characteristic in an internal memory 51. In the third embodiment, the memory 51 serves as a range correction section and a modulation width correction section.

In the embodiments shown in FIGS. 6 and 7, the modulation signal is corrected so that the frequency modulation characteristic that can be detected easily in the inexpensive configuration is not placed out of a predetermined normal range and thus the frequency modulation characteristic can also be corrected easily in the inexpensive configuration.

FIG. 8 shows a partial electric configuration of an FM-CW system radar 61 of a fourth embodiment of the invention. In the fourth embodiment, a beat signal output from an amplifier 28 is converted into a digital signal by an A/D converter 62 and signal level is obtained by a DSP (digital signal processor) 64 and FFT processing 63 by a microcomputer. The FFT processing 63, which is fast Fourier transform processing, is implemented as the program operation of the DSP 64, etc. A signal processing circuit 70 of the embodiment includes the A/D converter 62 and the DSP 64. The signal level of the beat signal can be determined as to any reference level.

FIG. 9 shows a partial electric configuration of an FM-CW system radar 71 of a fifth embodiment of the invention. In the fifth embodiment, a beat signal is detected by a detection circuit 74 and is compared with a reference signal by a comparator 75 for determining signal level. To set the reference signal given to the comparator 75, the beat signal is converted into a digital signal by an A/D converter 72 and arithmetic processing is performed by a microcomputer 73, a DSP, etc. A signal processing circuit 80 of the embodiment includes the A/D converter 72 and the microcomputer 73.

Figure 10:
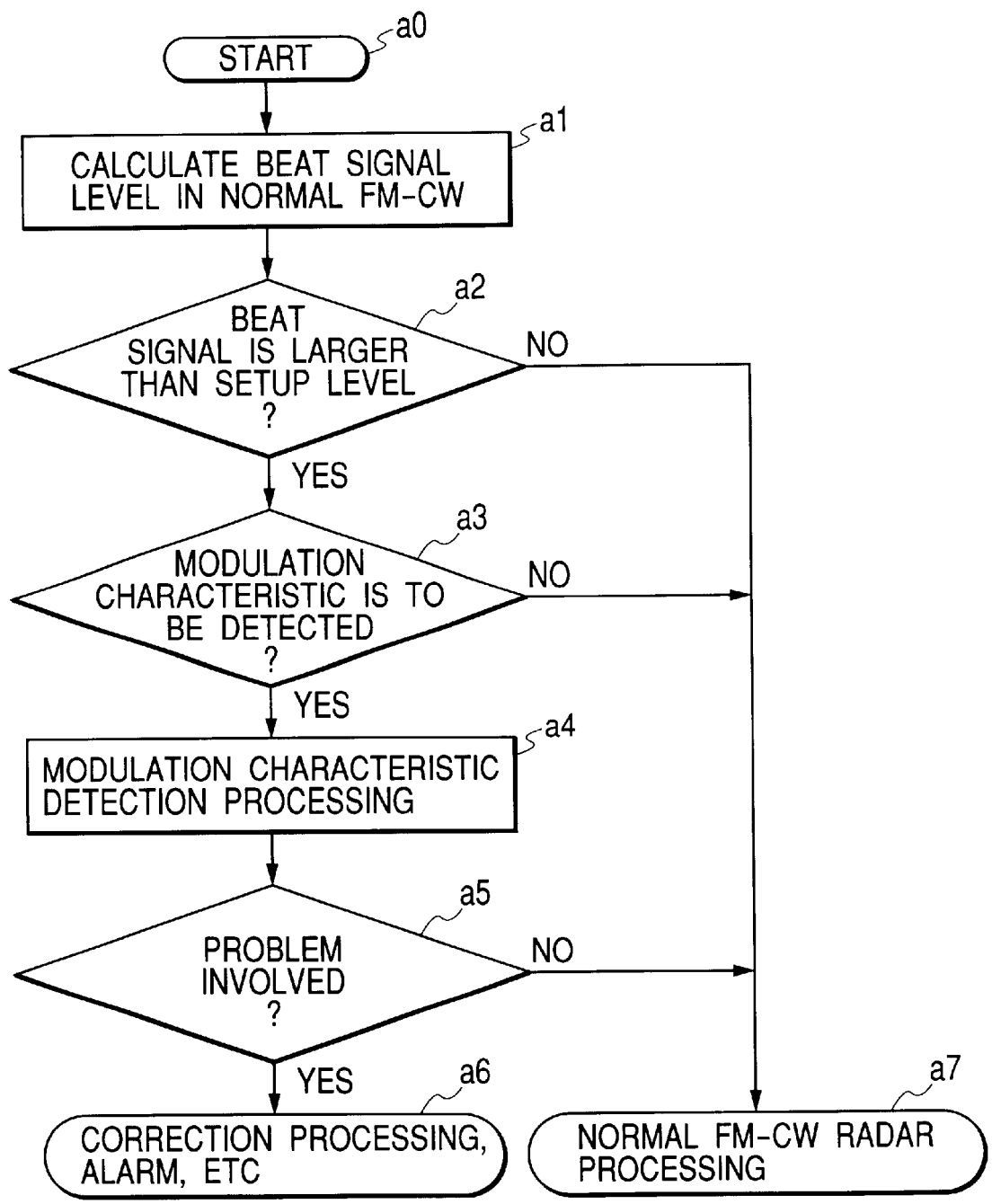
FIG. 10 is a flowchart to show a processing procedure in the embodiments in FIGS. 8 and 9.

FIG. 10 shows a processing procedure of detecting the frequency modulation characteristic in response to the signal level of a reception signal in the fourth and fifth embodiments previously described with reference to FIGS. 8 and 9. The procedure is started at step a0. At step a1, the beat signal level is calculated as the usual FM-CW radar. At step a2, whether or not the beat signal level is greater than a setup reference level is determined. If it is determined that the beat signal level is greater than the setup level, whether or not the frequency modulation characteristic is to be detected is determined at step a3. The frequency modulation characteristic may be detected, for example, for the first detected target after the power is turned on, and need not always be detected. If it is determined at step a3 that the frequency modulation characteristic is to be detected, detection processing of the frequency modulation characteristic is performed at step a4 in a similar manner to that in the first embodiment. At a5, whether or not the detection result involves a problem is determined. If the detection result involves a problem, at step a6, correction processing is performed as in the second or third embodiment or warning processing with an alarm, etc., is performed. If it is not determined at step a2 that the beat signal level is greater than the setup level, if it is not determined at step a3 that the frequency modulation characteristic is to be detected, or if it is not determined at step a5 that the detection result involves a problem, normal FM-CW radar processing is performed at step a7. When the input level of the reception signal is equal to or greater than the predetermined reference level, a correction is made and thus can be made stably.

If the target is detected initially and it is made possible to receive the reflected radio wave at step a3, occurrence of an anomaly can also be found at an early stage by determining whether or not the frequency modulation characteristic of the VCO 24 is normal.

Figure 11:
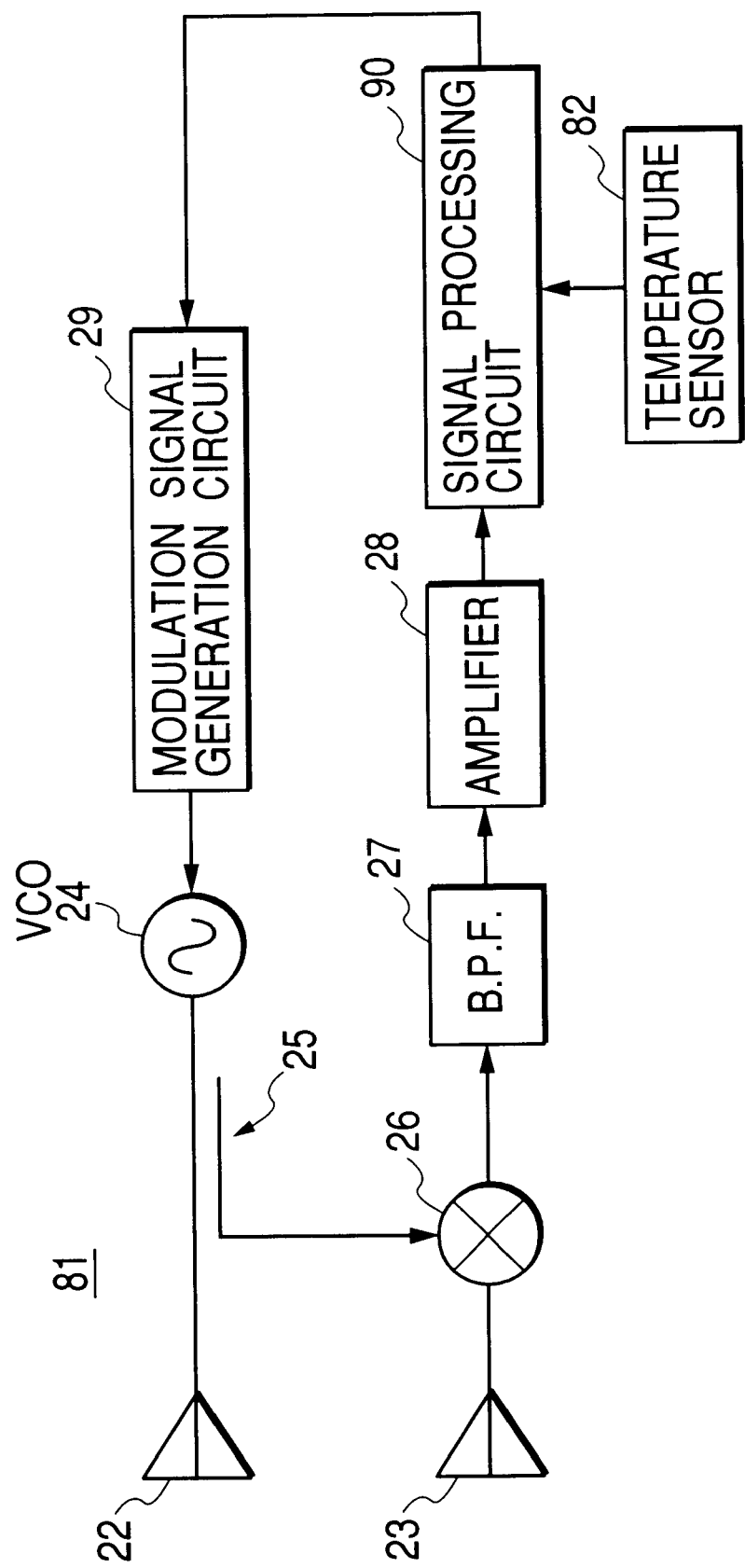
FIG. 11 is a block diagram to show a schematic electric configuration of an FM-CW system radar 81 of a sixth embodiment of the invention.

FIG. 11 shows a schematic electric configuration of an FM-CW system radar 81 of a sixth embodiment of the invention. In the sixth embodiment, the temperature in the proximity, etc., of a VCO 24 is detected by a temperature sensor 82 such as a thermister and if the frequency modulation characteristic of the VCO 24 changes with the temperature, it is also made possible to make a correction for each arbitrary temperature and the accuracy of the frequency modulation characteristic can be enhanced. The temperature detected by the temperature sensor 82 is given to a signal processing circuit 90 and a correction can be made in a similar manner to that in the embodiments previously described with reference to FIGS. 6, 7. A correction can also be made if the temperature detected by the temperature sensor 82 as a temperature detection section becomes a predetermined temperature. When the frequency of a high-frequency signal generated from the VCO 24 changes with the temperature, since a correction is made if the predetermined temperature is reached, so that the effect of the temperature can be decreased and the accuracy of the frequency modulation characteristic can be enhanced.

In the embodiments of the invention, preferably, if the distance to the target is in the predetermined distance range, the frequency modulation characteristic is detected and corrected and/or if the relative speed of the target is in the predetermined speed range, the frequency modulation characteristic is detected and corrected. The distance range, etc., having a high possibility that the signal level of the reception signal will lower is placed out of the predetermined distance range, whereby detection processing and correction processing are not entered at such a distance, so that accuracy degradation of detection and correction can be avoided. With regard to the relative speed, the relative speed of the target is considered and if the relative speed of the target is placed in the predetermined speed range, detection and correction are executed, so that the accuracy can be enhanced.

Figure 12:
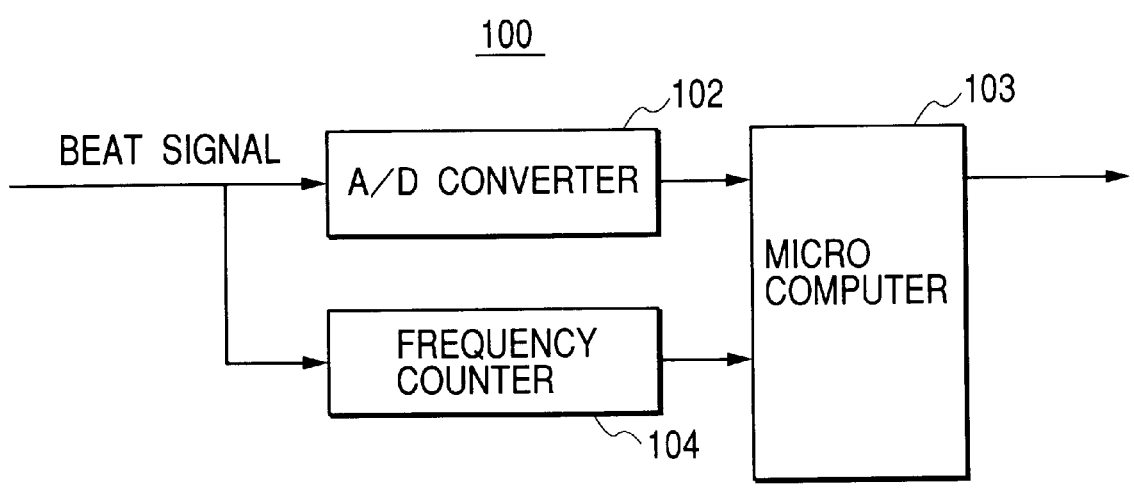
FIG. 12 is a block diagram to show the electric configuration of a signal processing circuit 100 of an FM-CW system radar of a seventh embodiment of the invention.

FIG. 12 shows a partial electric configuration of a signal processing circuit 100 of an FM-CW system radar of a seventh embodiment of the invention. In the seventh embodiment, a beat signal is converted into a digital signal by an A/D converter 102 and the digital signal is input to a microcomputer 103 in a similar manner to that in the embodiment previously described with reference to FIG. 9, and the frequency count result of a frequency counter 104 is input to the microcomputer 103. Since the frequency counter 104 is used, frequency measurement of the beat signal can be conducted easily.

Figure 13:
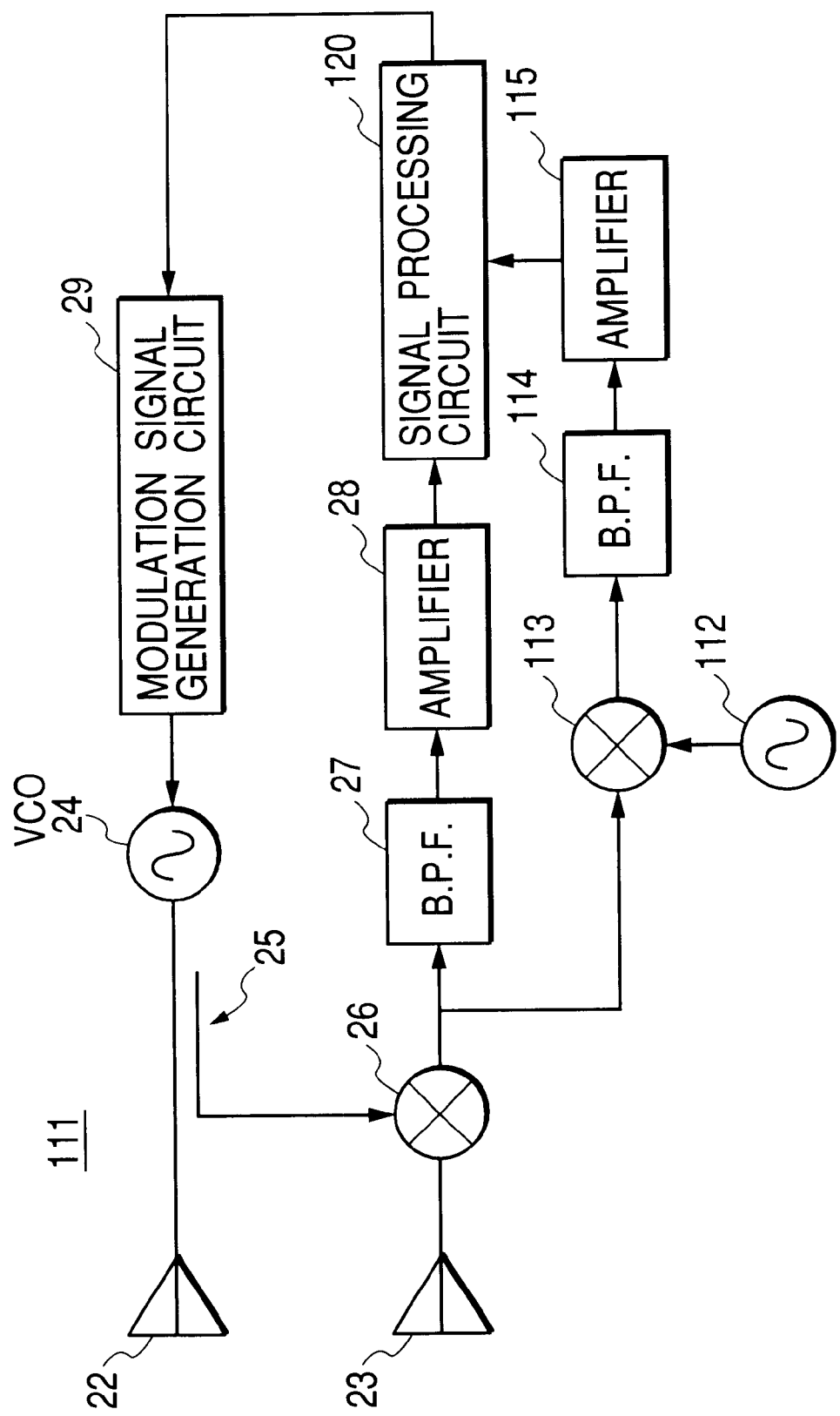
FIG. 13 is a block diagram to show a schematic electric configuration of an FM-CW system radar 111 of an eighth embodiment of the invention.

FIG. 13 shows a schematic electric configuration of an FM-CW system radar 111 of an eighth embodiment of the invention. In the eighth embodiment, a beat signal of the FM-CW system radar is mixed with a reference signal generated from a signal source 112 by a mixer 113 for heterodyning and further the frequency can be lowered for facilitating frequency measurement. An output of the mixer 113 is selected through a BPF 114 and is amplified by an amplifier 115 and is fed into a signal processing circuit 120. The signal processing circuit 120 detects and corrects the frequency modulation characteristic in a similar manner to that in each embodiment described above.

FIG. 14 shows an example of implementing the signal source 112 in the embodiment in FIG. 13. In FIG. 14 (a), a changeover switch 114, a frequency divider 115', and an oscillator 116 are included. The oscillator 116 becomes a basic signal generation section for generating a basic signal as a source of the reference signal. The frequency divider 115' becomes a frequency division section for dividing the frequency of the basic signal according to one of frequency dividing ratios that can be switched by the changeover switch 114 for converting the basic signal into the reference signal. In FIG. 14 (b), outputs of a plurality of oscillators 117, 118, and 119 are switched by the changeover switch 114. In FIG. 14 (c), the signal processing circuit 120 directly generates the reference signal by performing program processing and feeds the signal into the mixer 113. The reference signal and a clock signal based on which the signal processing circuit 120 operates can be generated in common.

As shown in FIG. 14 (a), if the frequency dividing ratio is changed for switching the frequency of the reference signal provided by dividing the frequency of the basic signal generated from the basic signal generation section, the frequency measurement accuracy can be enhanced. As shown in FIG. 14 (b), if any of the oscillator 117, 118, or 119 is selected for generating the reference signal, it is made possible to determine the frequency to be measured, and the accuracy can be enhanced. As shown in FIG. 14 (c), if the reference signal is generated by performing arithmetic processing following the preset program, the reference signal of the frequency being suitable for frequency measurement can be generated to enhance the measurement accuracy. If the reference signal and the clock signal of the signal processing circuit 120 are used as a common signal, the need for providing new signal source 113 is eliminated and space saving and cost reduction are made possible.

In the embodiment in FIG. 13, the frequency of the reference signal is set so that the difference from the frequency of the reception signal from the target becomes within the beat signal band at the radar operation time. Since the reference signal set within the beat signal band is used, the band of the frequency of the difference provided by heterodyning can be lowered for enhancing the measurement accuracy. In FIG. 13, the signal processing circuit 120 performs at least a part of beat signal processing in the FM-CW system radar. Since the configuration is shared between at least a part of beat signal processing and a part of detection processing of the frequency modulation characteristic, the whole configuration is simplified and can be implemented at low costs.

Figure 15:
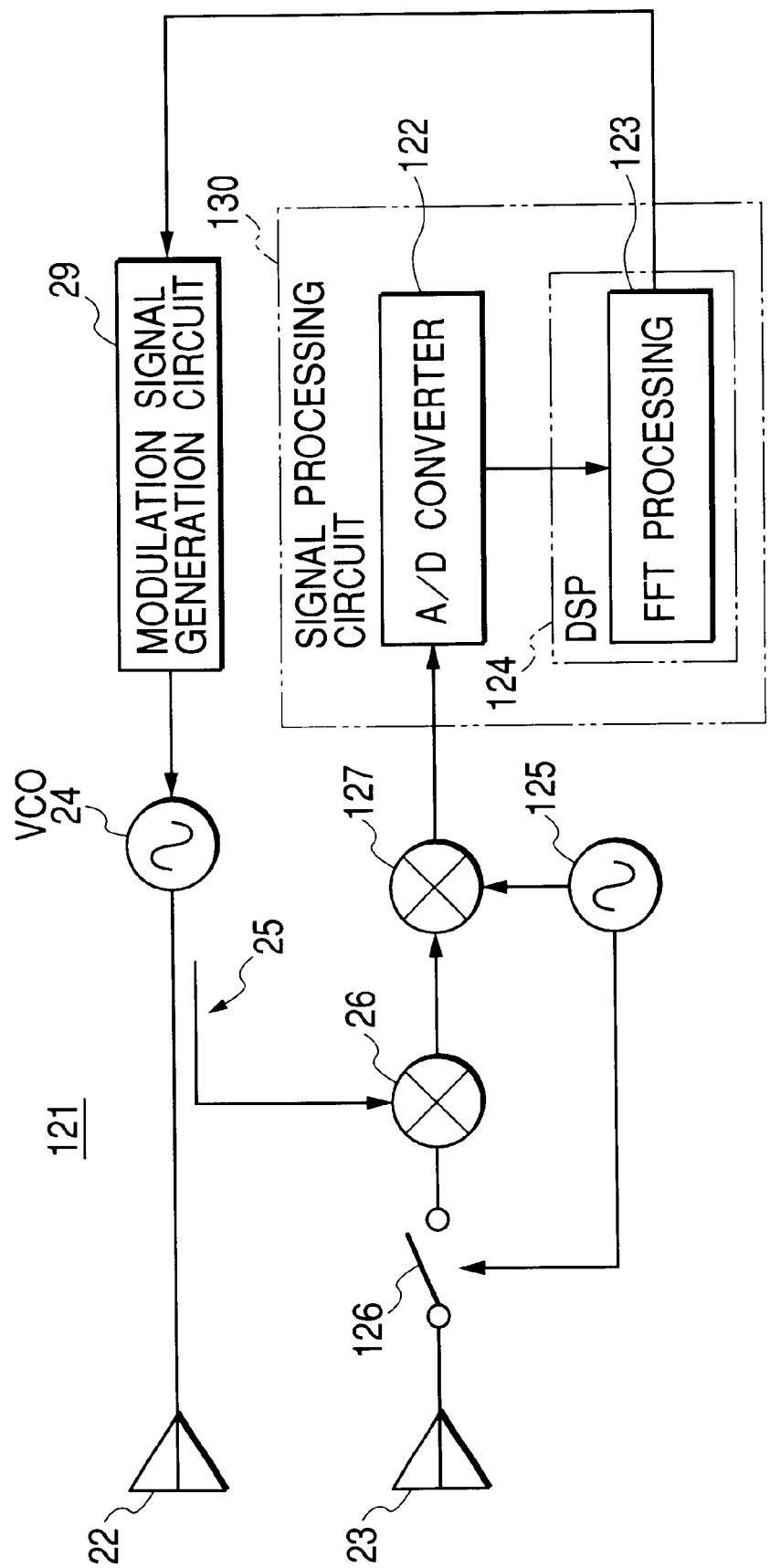
FIG. 15 is a block diagram to show a schematic electric configuration of an FM-CW system radar-121 of a ninth embodiment of the invention.

FIG. 15 shows a schematic electric configuration of an FM-CW system radar 121 of a ninth embodiment of the invention. In the ninth embodiment, the concept disclosed as the second embodiment in JP-A-5-40169 can be applied for enhancing the S/N ratio of a reception signal. A beat signal is converted into a digital signal by an A/D converter 122 and FFT processing 123 is performed by a DSP 124, etc. A modulation signal is fed into a gate switch 126 from a signal source 125 for performing frequency modulation of a reception signal. Then, the beat signal is provided by a mixer 26 and further is mixed with the modulation signal by a mixer 127 and the resultant signal is detected. A signal processing circuit 130 of the embodiment includes the A/D converter 122 and the DSP 124.

In the embodiments described above, preferably the time (t1, t2, t3, ..., tn) taken for holding the voltage level in a plurality of values in the range of V1 to V2 in the modulation signal for detection shown in FIGS. 4 (a) and 5 (b) is changed in response to the distance to the target and the relative speed. Accordingly, frequency modulation characteristic detection can be optimized in response to the distance to the target and the relative speed and the detection accuracy can be enhanced.

Preferably, the signal processing circuit in each embodiment detects the frequency of the beat signal component of the difference between the high-frequency signal and the reception signal considering the Doppler shift based on the relative speed of the target. If it is difficult to find out a relatively still object when the radar is installed in an automobile, etc., the frequency modulation characteristic can be detected with good accuracy considering the Doppler shift.

In the embodiments, the FM-CW system radars have been described, but the invention can also be applied to radars if the radars use frequency modulation.

As described above, according to the invention, the reception signal from the target can be used to detect the frequency modulation characteristic of the high frequency generation section. The reception signal can be used as the high-frequency signal source to detect the frequency modulation characteristic and the mixing section for reception can also be shared, so that the frequency modulation characteristic can be detected easily in the inexpensive configuration.

According to the invention, the modulation signal is corrected so that the frequency modulation characteristic is not placed out of the predetermined normal range, so that the frequency modulation characteristic can be corrected easily in the inexpensive configuration.

According to the invention, the frequency modulation width can be calculated from frequency change between a plurality of signal levels.

According to the invention, frequency change is counted by the counter, so that frequency change can be measured easily.

According to the invention, the frequency modulation width of the frequency modulation characteristic can be corrected to the predetermined value.

According to the invention, if the level of the reception signal is equal to or greater than the predetermined level, a stable correction can be made.

According to the invention, the effect of the temperature can be decreased and the accuracy of the frequency modulation characteristic can be enhanced.

According to the invention, if the distance to the target is placed out of the appropriate range, correction processing is not entered, so that accuracy degradation of correction can be avoided.

According to the invention, the relative speed of the target is considered and the accuracy of the correction can be enhanced. For example, targets for generating high relative speed components, such as a road side object and an incoming vehicle, are placed out of the objects, the accuracy can be enhanced.

According to the invention, if the input level of the reception signal is less than the predetermined reference level, the radar apparatus can concentrate attention on usual target detection processing. Whether or not detection processing of the frequency modulation characteristic is to be performed is determined based on the signal level at the usual radar operation time, so that the number of detection processing times can be decreased.

According to the invention, if the distance to the target is out of the predetermined distance range, the radar apparatus can concentrate attention on usual target detection processing.

According to the invention, if an anomaly occurs in the frequency modulation characteristic of the high frequency modulation section, it can be found at an early stage.

According to the invention, for the beat signal of the component of the difference between the high-frequency signal and the reception signal provided by the mixing section, the reference signal generated from the reference signal source is heterodyned and the frequency is decreased, so that frequency measurement of the beat signal is facilitated.

According to the invention, a plurality of frequency dividing ratios can be switched for lowering the frequency, and the frequency measurement accuracy can be enhanced.

According to the invention, a plurality of reference signals are switched and the signal components provided by switching the reference signals are compared, whereby it is made possible to determine the frequency to be measured, and the accuracy can be enhanced.

According to the invention, the reference signal of the frequency fitted for frequency measurement can be generated for enhancing the measurement accuracy.

According to the invention, generation of the reference signal and clock signal supply to the signal processing section can be conducted in common and space saving and cost reduction are made possible.

According to the invention, the reference signal set within the beat signal band is used and the measurement accuracy can be enhanced.

According to the invention, the configuration is shared between at least a part of beat signal processing and a part of detection processing of the frequency modulation characteristic, the whole configuration can be simplified, the costs can be reduced.

According to the invention, frequency modulation characteristic detection can be optimized in response to the distance to the target and the detection accuracy can be enhanced.

According to the invention, the detection accuracy of the frequency modulation characteristic can be enhanced considering the relative speed with the target.

According to the invention, if it is difficult to find out a relatively still object, the frequency modulation characteristic can be detected with good accuracy considering the Doppler shift.

What is claimed is:

1. A radar apparatus for performing frequency modulation of a high-frequency signal, transmitting the frequency-modulated signal, and receiving a reflected radio wave to detect a target, the radar apparatus comprising:

a high frequency generation section for generating the high-frequency signal;

a modulation signal generation section for generating and giving a modulation signal to the high frequency generation section to modulate the high frequency signal;

a mixing section for mixing the high-frequency signal and the reception signal of the reflected radio wave; and a signal processing section for controlling the modulation signal generation section so as to give a modulation signal for detection changing among a plurality of predetermined signal levels and retained for a predetermined time for each signal level to the high frequency generation section, detecting frequency of a differential signal between the high-frequency signal and the reception signal, inputted from the mixing section, and detecting a frequency modulation characteristic of the high frequency generation section based on the relationship between a signal level of the modulation signal for detection and the frequency of the differential signal.

2. The radar apparatus according to claim 1, further comprising a modulation characteristic correction section for correcting the modulation signal based on the frequency modulation characteristic detected by the signal processing section so that the frequency modulation characteristic is not placed out of a predetermined normal range.

3. The radar apparatus according to claim 1, further comprising a width calculation section for calculating frequency modulation width, which is a difference between frequency of the differential signal when the signal level of the modulation signal is the maximum value and frequency of the differential signal when the signal level is the minimum value based on the frequency modulation characteristic detected by the signal processing section.

4. The radar apparatus according to claim 3, wherein the width calculation section includes a counter for counting the frequency of the difference.

5. The radar apparatus according to claim 3, further comprising a width correction section for correcting the modulation signal based on the frequency modulation width calculated by the width calculation section so that the frequency modulation width has a predetermined value.

6. The radar apparatus according to claim 2, wherein one of the modulation characteristic correction section and the width correction section performs the correction when the level of the reception signal of the reflected radio wave is equal to or greater than a predetermined level.

7. The radar apparatus according to claim 2, further comprising a temperature detection section, wherein one of the modulation characteristic correction section and the width correction section performs the correction when a temperature detected by the temperature detection section has a predetermined temperature.

8. The radar apparatus according to claim 2, wherein one of the modulation characteristic correction section and the width correction section performs the correction when a distance to the target is in a predetermined distance range.

9. The radar apparatus according to claim 2, wherein one of the modulation characteristic correction section and the width correction section performs the correction when relative speed of the target is in a predetermined speed range.

10. The radar apparatus according to claim 1, wherein the signal processing section detects the frequency modulation characteristic when an input level of the reflected radio wave from the target is equal to or greater than a predetermined reference level at a normal radar operation time.

11. The radar apparatus according to claim 1, wherein the signal processing section detects the frequency modulation characteristic when a distance to the target is in a predetermined distance range.

12. The radar apparatus according to claim 1, wherein the signal processing section detects the frequency modulation characteristic just after detecting the target initially after a radar operation starts and determines whether or not a normal modulation operation for the high frequency generation section is performed.

13. The radar apparatus according to claim 1, further comprising a reference signal source for generating a reference signal to decrease a frequency with respect to the differential signal between the high-frequency signal and the reception signal, the differential signal inputted to the signal processing section from the mixing section, wherein the signal processing section detects the frequency modulation characteristic based on the inputted differential signal with the frequency decreased by the reference signal.

14. The radar apparatus according to claim 13, wherein the reference signal source comprises:

a basic signal generation section for generating a basic signal, which is a source of the reference signal; and a frequency division section for dividing the frequency of the basic signal generated from the basic signal generation section according to one of frequency dividing ratios that can be switched to convert the basic signal into the reference signal.

15. The radar apparatus according to claim 13, wherein the reference signal source includes a plurality of reference signal generation sections and selects one of the reference signal generation sections to generate the reference signal.

16. The radar apparatus according to claim 13, wherein the reference signal source comprises a signal arithmetic section for generating the reference signal by performing arithmetic processing according to a preset program.

17. The radar apparatus according to claim 13, wherein the reference signal source supplies a clock signal for a signal arithmetic processing to the signal processing section.

18. The radar apparatus according to claim 13, wherein a frequency of the reference signal is set so that a difference from the frequency of the reception signal from the target is within a beat signal band at a time of a radar operation.

19. The radar apparatus according to claim 18, wherein the signal processing section performs at least a part of processing of the beat signal.

20. The radar apparatus according to claim 1, wherein the signal processing section changes a predetermined time for holding a signal level of the modulation signal for detection in response to a distance to the target.

21. The radar apparatus according to claim 1, wherein the signal processing section changes a predetermined time for holding a signal level of the modulation signal for detection in response to a relative speed of the target.

22. The radar apparatus according to claim 1, wherein the signal processing section detects the frequency of the differential signal between the high-frequency signal and the reception signal considering a Doppler shift based on a relative speed of the target.

* * * * *